(12) United States Patent
Takemoto et al.

(10) Patent No.: US 11,196,317 B2
(45) Date of Patent: Dec. 7, 2021

(54) MOTOR INCLUDING A BRACKET BOARD SUPPORT STRUCTURE FOR A CIRCUIT BOARD

(71) Applicant: Nidec Corporation, Kyoto (JP)

(72) Inventors: Shinji Takemoto, Kyoto (JP); Kenji Fukami, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 169 days.

(21) Appl. No.: 16/535,278

(22) Filed: Aug. 8, 2019

(65) Prior Publication Data

US 2020/0106322 A1 Apr. 2, 2020

(30) Foreign Application Priority Data

Sep. 28, 2018 (JP) .............................. JP2018-183980

(51) Int. Cl.
*H02K 5/08* (2006.01)
*H02K 29/00* (2006.01)
(Continued)

(52) U.S. Cl.
CPC .................. *H02K 5/08* (2013.01); *B23K 1/14* (2013.01); *H02K 5/16* (2013.01); *H02K 11/00* (2013.01);
(Continued)

(58) Field of Classification Search
CPC . H02K 5/08; H02K 5/16; H02K 11/00; H02K 11/0094; H02K 11/30; H02K 21/14; H02K 211/03; H02K 29/00
(Continued)

(56) References Cited

U.S. PATENT DOCUMENTS 5,019,926 A * 5/1991 Van Thuijl ................ G11B 5/53
360/84
2007/0286753 A1* 12/2007 Ihle ......................... H02K 1/145
417/423.7
(Continued)

FOREIGN PATENT DOCUMENTS

CN 102900691 A 1/2013
CN 103457384 A 12/2013
(Continued)

OTHER PUBLICATIONS

Official Communication issued in corresponding Chinese Patent Application No. 201910851919.4, dated Jun. 3, 2021.

*Primary Examiner* — Tulsidas C Patel
*Assistant Examiner* — Rashad H Johnson
(74) *Attorney, Agent, or Firm* — Keating & Bennett (57) ABSTRACT

A motor includes a stationary structure, and a rotor rotatable about a central axis with respect to the stationary structure. The stationary structure includes a stator including a coil, a bracket that supports the stator, and a circuit board disposed between the stator and the bracket. The bracket includes a board support that holds the circuit board between the bracket and the stator in an axial direction. The board support includes a wiring through hole that penetrates the board support in the axial direction and through which a wire extending from the circuit board passes, a lid that partially covers the wiring through hole, and a guide bridge that is located inside the wiring through hole when viewed in the axial direction and holds the wire between the lid and the guide bridge.

7 Claims, 7 Drawing Sheets

(51) Int. Cl.
*H02K 11/00* (2016.01)
*B23K 1/14* (2006.01)
*H02K 5/16* (2006.01)
*H02K 21/14* (2006.01)
*H02P 6/08* (2016.01)
*B23K 101/32* (2006.01)

(52) U.S. Cl.
CPC .............. *H02K 21/14* (2013.01); *H02K 29/00* (2013.01); *H02P 6/085* (2013.01); *B23K 2101/32* (2018.08); *H02K 2211/03* (2013.01)

(58) Field of Classification Search
USPC ............................................ 310/71, 89, 90.5
See application file for complete search history.

(56) References Cited

U.S. PATENT DOCUMENTS

| | | | |
|---|---|---|---|
| 2013/0028765 A1 | 1/2013 | Yokozawa et al. | |
| 2013/0323093 A1* | 12/2013 | Tamaoka | F04D 25/0633 417/354 |
| 2013/0342934 A1* | 12/2013 | Shiraishi | G11B 19/2009 360/99.08 |
| 2014/0063653 A1* | 3/2014 | Saeki | H02K 7/085 360/99.08 |
| 2016/0294240 A1* | 10/2016 | Kawamoto | H02K 3/522 |

FOREIGN PATENT DOCUMENTS

| | | |
|---|---|---|
| CN | 106026476 A | 10/2016 |
| JP | 05-207719 A | 8/1993 |
| JP | 08-280160 A | 10/1996 |

\* cited by examiner

MOTOR INCLUDING A BRACKET BOARD SUPPORT STRUCTURE FOR A CIRCUIT BOARD

CROSS REFERENCE TO RELATED APPLICATION

The present invention claims priority under 35 U.S.C. § 119 to Japanese Application No. 2018-183980 filed on Sep. 28, 2018, the entire contents of which application are hereby incorporated herein by reference.

FIELD OF THE INVENTION

The present disclosure relates to a motor.

BACKGROUND

Conventionally, a motor in which a board having a drive circuit mounted thereon is built in a case has been known.

In a motor with a built-in board, power supply wire and signal wire extending from the board are drawn out of the case. When an external force is applied to the wire drawn out of the case, the wire may be detached from the board and disconnected.

SUMMARY

According to one aspect of an example embodiment of the present disclosure, a motor including a stationary structure, and a rotor rotatable about a central axis with respect to the stationary structure. The stationary structure includes a stator including a coil, a bracket that supports the stator, and a circuit board disposed between the stator and the bracket. The bracket includes a board support that holds the circuit board between the bracket and the stator in an axial direction. The board support includes a wiring through hole that penetrates the board support in the axial direction and through which a wire extending from the circuit board passes, a lid that partially covers the wiring through hole, and a guide bridge that is located inside the wiring through hole when viewed in the axial direction and holds the wire between the lid and the guide bridge.

The above and other elements, features, steps, characteristics and advantages of the present disclosure will become more apparent from the following detailed description of the example embodiments with reference to the attached drawings.

DETAILED DESCRIPTION

In each of the drawings, a Z-axis direction is an up-and-down direction in which a positive side is the upper side and a negative side is the lower side. An axial direction of a central axis J that is a virtual axis appropriately shown in each drawing is parallel to the Z-axis direction, that is, the up-and-down direction. In the below description, unless otherwise specified, a direction parallel to the axial direction of the central axis J is simply referred to as "axial direction", "axial", or "axially, a radial direction centered on the central axis J is simply referred to as "radial direction", "radial", or "radially", and a circumferential direction about the central axis J is simply referred to as "circumferential direction", "circumferential", or "circumferentially".

In the present example embodiment, a lower side corresponds to one side in the axial direction, and an upper side corresponds to the other side in the axial direction. The upper side and the lower side are simply names for describing a relative positional relationship of each part, and the actual arrangement relationship may be an arrangement relationship other than the arrangement relationship and the like indicated by these names.

Figure 1:
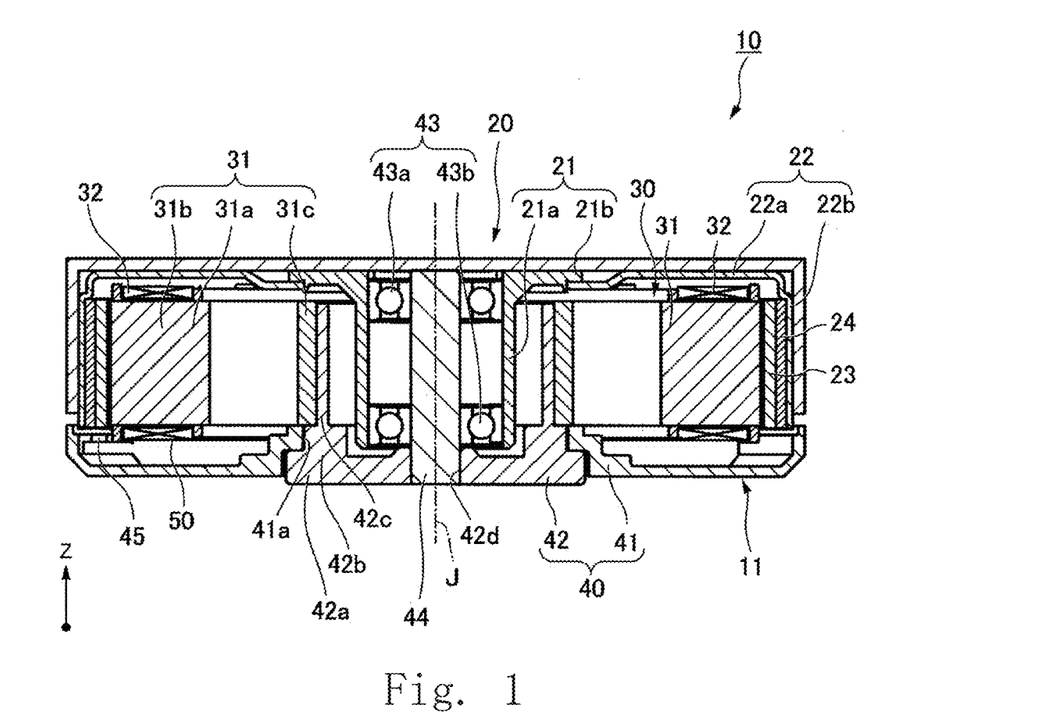
FIG. 1 is a cross-sectional view showing a motor according to an example embodiment of the present disclosure.
Figure 2:
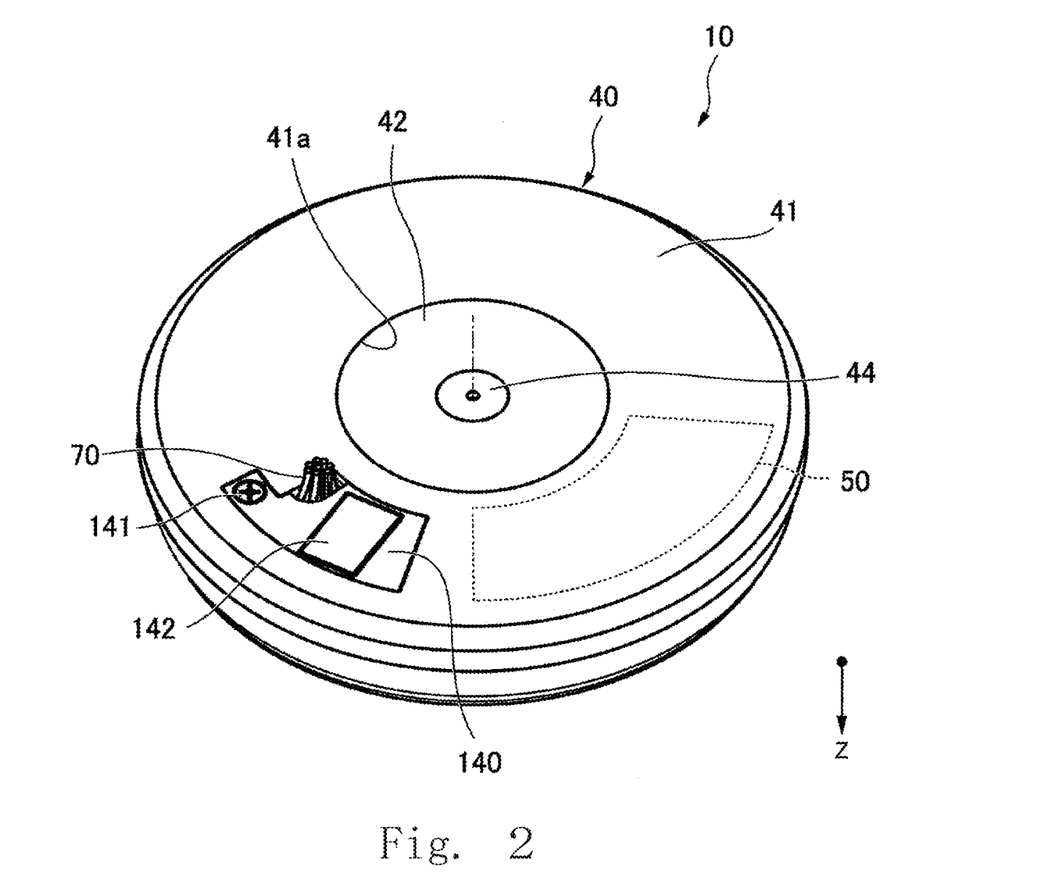
FIG. 2 is a perspective view of a motor according to an example embodiment of the present disclosure as viewed from below.

FIG. 1 is a cross-sectional view showing a motor according to the present example embodiment. FIG. 2 is a perspective view of the motor according to the present example embodiment as viewed from below.

As shown in FIG. 1, a motor 10 of the present example embodiment is an outer rotor-type motor. The motor 10 has a stationary structure 11 and a rotor 20. The stationary structure 11 includes a stator 30, a bracket 40, and a circuit board 50.

The bracket 40 has a board support part 41, a stator holder 42, a bearing part 43, and a shaft 44.

The board support part 41 is an annular case body opened upward. The bottom surface of the board support part 41 has an annular plate shape whose plate surface is perpendicular to the axial direction. On the board support part 41, a plate-shaped circuit board 50 extending in a direction perpendicular to the central axis J is disposed.

The board support part 41 has a central hole portion 41a penetrating the board support part 41 in the axial direction. The central hole portion 41a has a circular shape centered on the central axis J when viewed in the axial direction. The stator holder 42 is disposed inside the central hole portion 41a.

As shown in FIG. 1, the stator holder 42 includes a base portion 42a extending radially outward from the central axis J, a cylindrical case fixing portion 42b extending upward from the upper surface of the base portion 42a, and a cylindrical stator fixing portion 42c extending upward from the upper surface of the case fixing portion 42b. The base portion 42a has an annular plate shape centered on the central axis J. The base portion 42a has a shaft fixing hole 42d axially penetrating the base portion 42a, at a central portion viewed in the axial direction. The lower end portion of the shaft 44 is fixed to the shaft fixing hole 42d. The shaft 44 is in a columnar shape centered on the central axis J and extending in the up-and-down direction.

The case fixing portion 42b and the stator fixing portion 42c each have a cylindrical shape centered on the central axis J. The central hole portion 41a of the board support part 41 is fixed to the outer peripheral surface of the case fixing portion 42b. The case fixing portion 42b and the central hole portion 41a can be fixed by press-fitting or adhesion. The stator core 31 is fixed to the stator fixing portion 42c.

In the case of the present example embodiment, the bearing part 43 has two ball bearings 43a and 43b. The bearing part 43 may be a cylindrical slide bearing. The shaft 44 is inserted in the inner ring of the ball bearings 43a and 43b. A wave washer is inserted between the ball bearings 43a and 43b axially aligned. The outer ring of the ball bearings 43a and 43b support the rotor 20.

The stator 30 is disposed on the upper side of the board support part 41, as shown in FIG. 1. The stator 30 faces the rotor 20 in the radial direction via a gap. The stator 30 includes a stator core 31 and a plurality of coils 32. The stator core 31 radially faces the rotor magnet 23 and the rotor core 24 via a gap. The stator core 31 has a core back 31a, a plurality of teeth 31b, and a connecting portion 31c.

The core back 31a is annular and extends in the circumferential direction. The core back 31a has an annular shape centered on the central axis J. The connecting portion 31c is a spoke-like portion extending radially inward from the core back 31a. The radially inner end of the connecting portion 31c is annular as viewed in the axial direction. The connecting portion 31c is fixed to the outer peripheral surface of the stator fixing portion 42c. Thereby, the stator 30 is fixed to the bracket 40.

The plurality of teeth 31b extend radially outward from the core back 31a. The plurality of teeth 31b are arranged at equal intervals along one round in the circumferential direction.

A plurality of coils 32 are attached to the stator core 31. More specifically, the plurality of coils 32 are attached to the plurality of teeth 31b, respectively. A resin insulator may be disposed between the coil 32 and the tooth 31b. The coil 32 is configured of a coil wire wound around the tooth 31b. Although not shown, an end of the coil wire constituting the coil 32 extends downward from the coil 32 and is connected to the circuit board 50.

The circuit board 50 is disposed below the stator 30. That is, the circuit board 50 is disposed between the stator 30 and the board support part 41 in the axial direction. A plurality of hall sensors 45 are mounted on the upper surface of the circuit board 50. An inverter circuit, a power supply circuit, and the like may be mounted on the upper and lower surfaces of the circuit board 50.

The hall sensor 45 detects a leakage flux from the rotor magnet 23 when the rotor 20 rotates. Three hall sensors 45 are arranged at equal angles in the circumferential direction. The hall sensors 45 are disposed at intervals of 30° in the circumferential direction, for example. The arrangement pitch of the hall sensors 45 may be 60° or 120°.

The rotor 20 has a hub 21, a rotor holder 22, a rotor magnet 23, and a rotor core 24. The hub 21 has a cylindrical portion 21a extending along the central axis J, and a disk-shaped connecting portion 21b extending radially outward from the outer peripheral surface of the cylindrical portion 21a. The cylindrical portion 21a accommodates therein the ball bearings 43a and 43b supported by the shaft 44. The rotor 20 is rotatably supported around the central axis J by the ball bearings 43a and 43b.

The rotor holder 22 is fixed to the outer peripheral end of the connecting portion 21b of the hub 21. The rotor holder 22 has a lid portion 22a and a tubular portion 22b. The lid portion 22a has an annular plate shape when viewed in the axial direction. In the case of the present example embodiment, the connecting portion 21b of the hub 21 is crimped and fixed to a through hole at the center of the lid portion 22a. The rotor holder 22 covers the upper side of the stator 30.

The tubular portion 22b has a tubular shape extending downward from the radially outer peripheral edge of the lid portion 22a. The tubular portion 22b has a cylindrical shape centered on the central axis J. The rotor core 24 is fixed to the inner peripheral surface of the tubular portion 22b. The rotor magnet is a permanent magnet and is adhesively fixed to the inner circumferential surface of the rotor core 24. The rotor magnet 23 and the rotor core 24 face the upper surface of the circuit board 50 with a gap in the axial direction.

In the motor 10 of the present example embodiment, as shown in FIG. 2, the wires 70 extending from the circuit board 50 are drawn out of the lower surface of the motor 10. Hereinafter, the wire fixing structure in the wire lead-out portion of the motor 10 will be described in detail with reference to FIGS. 3 to 7.

Figure 3:
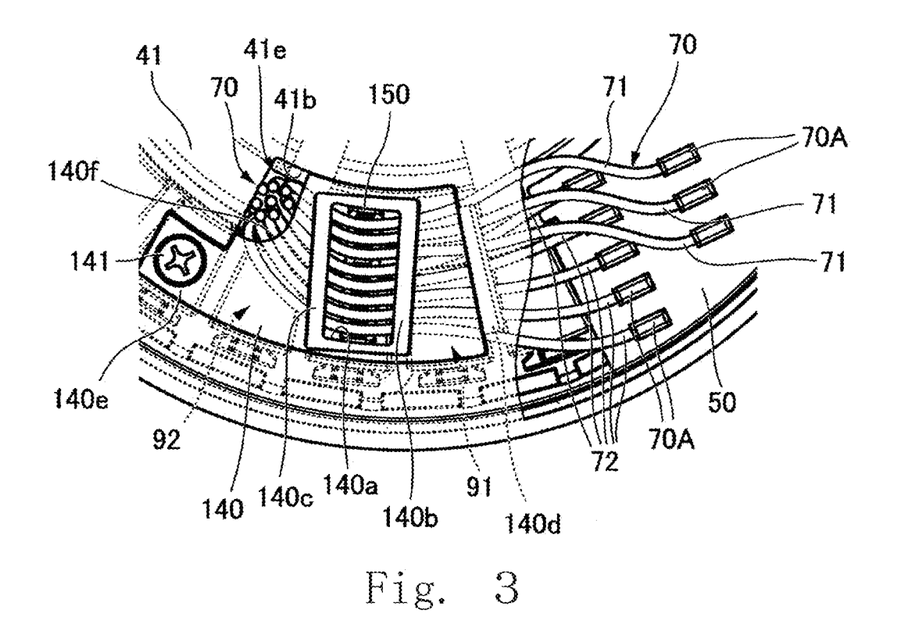
FIG. 3 is a partial plan view showing a wire fixing structure in a motor of an example embodiment of the present disclosure.
Figure 4:
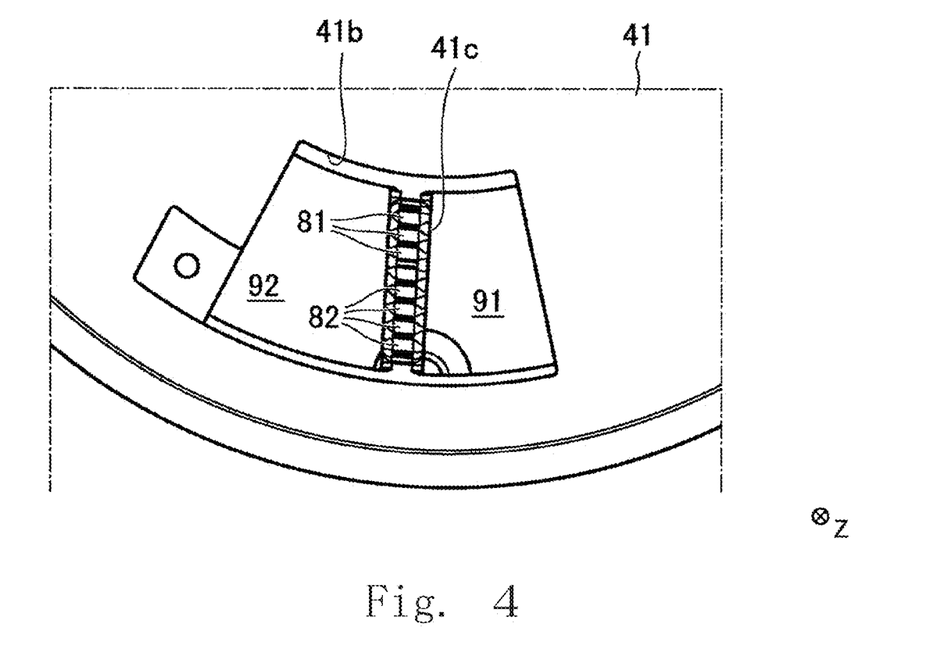
FIG. 4 is a plan view of a board support as viewed from below.

FIG. 3 is a partial plan view showing the wire fixing structure in the motor of the present example embodiment. FIG. 4 is a plan view of the board support part 41 in which a lid member 140 is removed, as viewed from below.

The board support part 41 has the lid member 140 at a position where the wires 70 are drawn out, as shown in FIGS. 2 and 3. As shown in FIG. 4, the board support part 41 has a wiring through hole 41b penetrating the board support part 41 in the axial direction. The lid member 140 is placed on the wiring through hole 41b from the lower side. Note that the wiring through hole 41b may reach the radially inner edge or the radially outer edge of the board support part 41. That is, the wiring through hole 41b may have a shape in which the inner peripheral end or the outer peripheral end of the board support part 41 is cut away.

The lid member 140 has a claw portion 140d at an end in the circumferential direction on the circuit board 50 side, and has a screwing portion 140e at an end in the circumferential direction on the opposite side of the circuit board 50. The claw portion 140d of the lid member 140 is hooked on the peripheral edge of the wiring through hole 41b extending in the radial direction. The lid member 140 is fixed to the board support part 41 by a screw 141 penetrating the screwing portion 140e in a state where the claw portion 140d is hooked to the wiring through hole 41b.

The lid member 140 has a lid member through hole 140a axially penetrating the lid member 140, at a central portion as viewed in the axial direction. The lid member through hole 140a is substantially rectangular as viewed in the axial direction. On the lower surface of the lid member 140, a seal member 142 is attached, which closes the lid member through hole 140a from the lower side. The seal member 142 is, for example, an adhesive seal having an adhesive layer on one surface of a film. A resin film or a metal foil can be used as a film to be the base of the seal member 142.

The lid member 140 partially covers the wiring through hole 41b. More specifically, the lid member 140 has a cutout portion 140f at one corner located at a radially inner side. The wiring through hole 41b is opened inside the cutout portion 140f. The wire 70 is drawn to the lower surface side of the motor 10 through the wiring through hole 41b and the cutout portion 140f.

A guide bridge 41c is provided inside the wiring through hole 41b. That is, the board support part 41 includes the wiring through hole 41b that axially penetrates the board support part 41 and through which the wire 70 extending from the circuit board 50 passes, the lid member 140 that partially covers the wiring through hole 41b, and the guide bridge 41c located inside the wiring through hole 41b as viewed in the axial direction and holding the wire 70 between the lid member 140 and the guide bridge 41c.

In the present example embodiment, the wiring through holes 41b of the board support part 41 has a fan shape whose circumferential length increases from the radially inner side toward the radially outer side. When viewed in the axial direction, the wiring through hole 41b is arranged next to the circuit board in the circumferential direction. According to this configuration, restriction of the installation space of the wiring through hole 41b is reduced as compared with the case where the wiring through hole 41b and the circuit board 50 are aligned in the radial direction. Since the wiring through hole 41b can be made relatively large, the workability at the time of fixing the wire 70 is improved.

The guide bridge 41c extends radially outward from the radially inner edge of the wiring through hole 41b, and is connected to the radially outer edge of the wiring through hole 41b. That is, the guide bridge 41c is bridged from the radially inner end of the wiring through hole 41b to the radially outer end, inside the wiring through hole 41b.

Since the circuit board 50 and the wiring through hole 41b are arranged side by side in the circumferential direction, the wires 70 enter the wiring through hole 41b in the circumferential direction. Therefore, if the guide bridge 41c is bridged in the radial direction, the wire 70 and the guide bridge 41c can be disposed substantially perpendicular to each other. Further, the plurality of wires 70 can be easily aligned in the radial direction on the guide bridge 41c. As a result, the wires 70 can be easily fixed firmly by the guide bridge 41c. In the present example embodiment, the guide bridge 41c is in a straight rod shape. The guide bridge 41c is a single member with the board support part 41.

The guide bridge 41c has three first recessed grooves 81 and five second recessed grooves 82 on the lower surface that is a surface facing one side in the axial direction. Each of the first recessed grooves 81 and the second recessed grooves 82 is a groove extending straight along the circumferential direction. The first recessed groove 81 and the second recessed groove 82 are parallel to each other and aligned in the radial direction.

Figure 5:
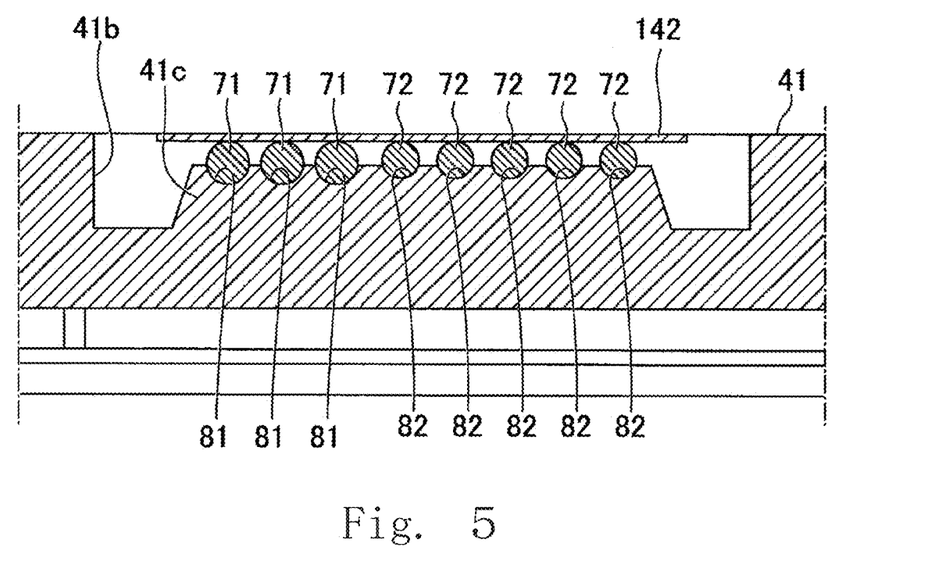
FIG. 5 is a diagram showing a configuration of a first recessed groove and a second recessed groove.

FIG. 5 is a partial cross-sectional view of the motor 10 showing the configuration of the first recessed grooves 81 and the second recessed grooves 82 of the guide bridge 41c.

As shown in FIG. 5, the first recessed groove 81 and the second recessed groove 82 respectively hold the wires 70 of different wire diameters. Specifically, the first recessed groove 81 holds the first wire 71 having a first wire diameter. The second recessed groove 82 holds a second wire 72 having a second wire diameter.

The first recessed groove 81 and the second recessed groove 82 are provided on the lower surface of the guide bridge 41c, and the guide bridge 41c radially crosses the wiring through hole 41b as shown in FIG. 4 to divide the wiring through hole 41b into two penetration regions 91 and 92. Therefore, the first wire 71 and the second wire 72 extending from the circuit board 50 pass downward through the penetration region 91 located on the circuit board 50 side, and pass through the lower surface of the guide bridge 41c to extend to the penetration region 92.

The first wire 71 is a wire having a diameter larger than that of the second wire 72. The three first wires 71 are, for example, U-phase, V-phase, and W-phase power supply wires connected to the coils 32 of the stator 30. The five second wires 72 are, for example, power supply wires and signal wires of the Hall sensor 45. One end of each of the first wire 71 and the second wire 72 is connected to the lower surface of the circuit board 50, as shown in FIG. 3. In the case of the present example embodiment, a connecting portion 70A between the wire 70 and the circuit board 50 is a solder joint portion.

As shown in FIG. 5, the first recessed groove 81 is a recessed groove deeper than the second recessed groove 82. More specifically, the axial distance from the bottom of the first recessed groove 81 to the lid member 140 is larger than the axial distance from the bottom of the second recessed groove 82 to the lid member 140. In the present example embodiment, as shown in FIG. 5, the depths of the first recessed groove 81 and the second recessed groove 82 are adjusted such that when the first wire 71 is held in the first recessed groove 81 and the second wire 72 is held in the second recessed groove 82, the upper end position of the first wire 71 and the upper end position of the second wire 72 are aligned. Thereby, when the lid member 140 is put on, the force to hold down the first wire 71 and the second wire 72 is made uniform, so that it is possible to suppress looseness of the fixing of some of the wires 70. In addition, when the lid member 140 is put on the wire 70, unevenness is less likely to appear on the surface of the seal member 142. Therefore, when the surface of the seal member 142 is rubbed by an external object, it is possible to prevent some wires 70 from being applied with excessive force.

In the present example embodiment, the first recessed groove 81 is located at a radially inner side from the second recessed groove 82. According to this configuration, since the first wire 71 having a relatively larger wire diameter passes the inner side than the second wire 72 having a smaller wire diameter, it is easy to make the wire length of the first wire 71 shorter than the wire length of the second wire 72 at least in the inside of the motor 10. As a result, the resistance reduction required for the first wire 71 with a larger wire diameter can be easily realized. Also, the manufacturing cost of the first wire 71 having a larger wire diameter can be easily reduced.

The lid member 140 is fixed to the wiring through hole 41b in a state where the first wire 71 and the second wire 72 are disposed in the first recessed groove 81 and the second recessed groove 82 of the guide bridge 41c, respectively. The wires 70 are fixed to the board support part 41 by the lid member 140 and the guide bridge 41c. The details will be described below.

Figure 6:
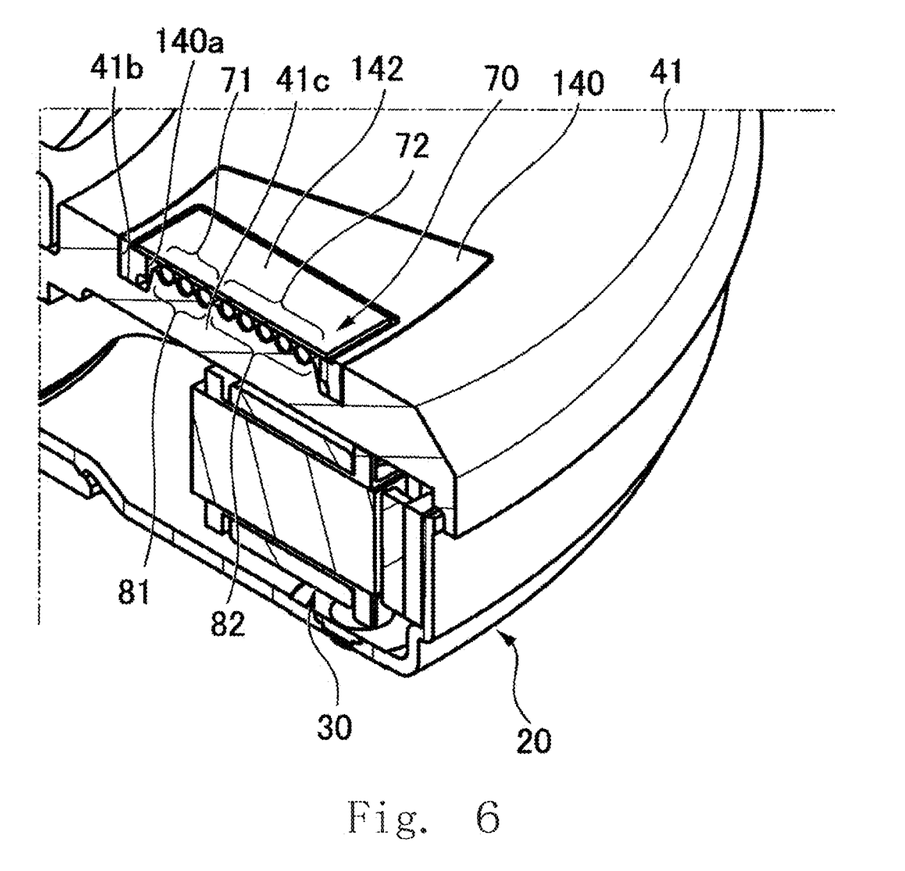
FIG. 6 is a diagram showing a wire stationary structure by a guide bridge and a lid.
Figure 7:
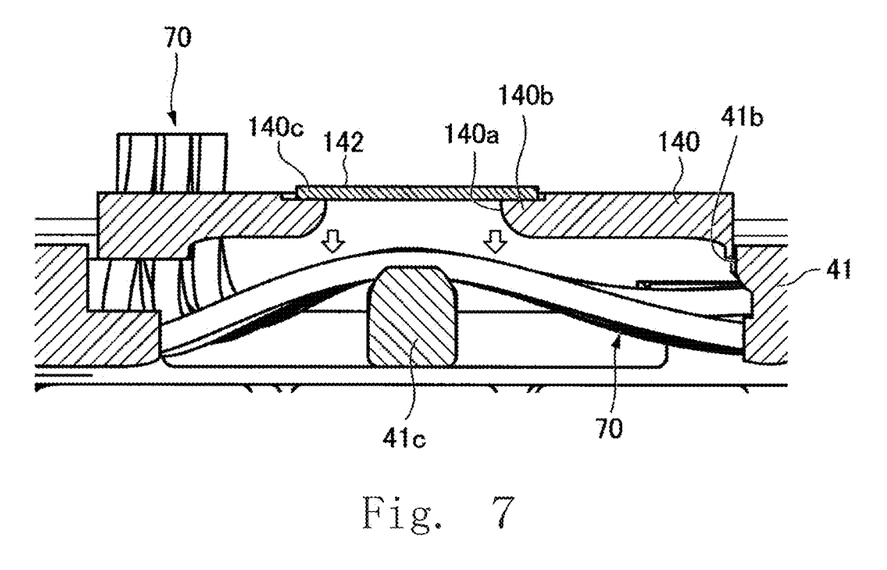
FIG. 7 is a diagram showing a wire stationary structure by a guide bridge and a lid.

FIG. 6 is a partial cross-sectional view of the motor 10 showing the wire fixing portion by the guide bridge and the lid member, as viewed from the circumferential direction. FIG. 7 is a partial cross-sectional view of the motor 10 showing the wire fixing portion by the guide bridge and the lid member, as viewed from the circumferential direction.

As shown in FIGS. 6 and 7, when the lid member 140 is attached to the wiring through hole 41b, the guide bridge 41c in the wiring through hole 41b is inserted in the lid member through hole 140a of the lid member 140. As a result, as shown in FIG. 7, edge portions 140b and 140c on both sides in the circumferential direction of the lid member through hole 140a are pressed against the wire 70 held by the guide bridge 41c.

With the above configuration, the wire 70 extending from the circuit board 50 is bent toward the lower surface side (upper side in FIG. 7) of the board support part 41 by the edge portion 140b and the guide bridge 41c on the front side of the guide bridge 41c, and at the back side of the guide bridge 41c, the wire 70 is bent toward the upper surface side (the lower side in FIG. 7) of the board support part 41 by the guide bridge 41c and the edge portion 140c.

Since the wire 70 is held in a bent state by the guide bridge 41c and the lid member 140 as described above, even when an external force is applied to the wire 70 drawn to the outside of the motor 10, the wire 70 is fixed at the position of the guide bridge 41c, so that no force is applied to the wire 70 between the guide bridge 41c and the circuit board 50. This can prevent damage to the connecting portion 70A due to the wire 70 being pulled. Therefore, according to the motor 10 of the present example embodiment, disconnection of the wire 70 can be suppressed. Further, since the circuit board 50 is unlikely to be pulled by the wire 70, the force acting on the circuit board 50 itself when an external force is applied to the wire 70 is also reduced. Therefore, according to the present example embodiment, damage to the electronic components, wires, solder, and the like on the circuit board 50 is also suppressed.

Further, the seal member 142 is attached from the upper side of the lid member through hole 140a. As shown in FIG. 6, the seal member 142 is attached to the wires 70 on the guide bridge 41c. Thereby, the plurality of wires 70 on the guide bridge 41c are fixed to each other by the seal member 142. Further, the plurality of wires 70 are fixed to the lid member 140 via the seal member 142. According to this configuration, even when only some of the plurality of wires 70 are pulled in the circumferential direction, it is possible to suppress movement of the some of the wires 70. In addition, the stability of wire fixing by the edge portions 140b and 140c and the guide bridge 41c can be enhanced.

In the motor 10 of the present example embodiment, the connecting portion 70A between the wire 70 and the circuit board 50 is a solder joint portion. In this example embodiment, even if an external force is applied to the wire 70, disconnection of the wire 70 can be suppressed by the guide bridge 41c and the lid member 140. Therefore, the wire 70 and the circuit board 50 can be connected by solder connection in which disconnection or breakage is more likely to be caused compared with the case of connector connection. As a result, the axial size of the connecting portion 70A can be reduced as compared with the case of using connector connection. Therefore, the motor 10 can be thinned. Further, since no connector is used, the manufacturing cost of the connecting portion 70A can be reduced.

In the present example embodiment, the lid member 140 is configured to have the lid member through hole 140a and the seal member 142 that closes the lid member through hole 140a. However, the present disclosure is not limited to this configuration. For example, the lid member 140 and the seal member 142 may be configured as a single member. That is, the lid member 140 may be configured to have a recess that is recessed to one side in the axial direction in a region facing the guide bridge 41c in the axial direction. Even in that case, the wire 70 can be pressed from one side in the axial direction by the edge of the recess, and the wire 70 can be held stably. Therefore, even in the configuration including the recess, it is possible to suppress disconnection in the case where an external force is applied to the wire 70.

In the present example embodiment, a configuration in which the wire 70 is bent and fixed by the edge portions 140b and 140c of the lid member 140 and the guide bridge 41c has been described. However, a configuration in which the edge portions 140b and 140c are not provided and the wire 70 is fixed by being interposed between the guide bridge 41c and the lid member 140 in the axial direction is also possible. Even in that case, application of a force to the wire 70 between the guide bridge 41c and the circuit board 50 can be suppressed, and disconnection of the wire 70 can be suppressed. In the configuration in which the wire 70 is axially interposed between, and fixed by, the guide bridge 41c and the lid member 140, the lid member 140 may or may not include the seal member 142.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A motor comprising:
a stationary structure; and
a rotor rotatable about a central axis with respect to the stationary structure; wherein
the stationary structure includes:
a stator including a coil;
a bracket that supports the stator; and
a circuit board disposed between the stator and the bracket;
the bracket includes a board support that holds the circuit board between the bracket and the stator in an axial direction;
the board support includes:
a wiring through hole that penetrates the board support in the axial direction and through which a wire extending from the circuit board passes;
a lid that partially covers the wiring through hole; and
a guide bridge that is located inside the wiring through hole when viewed in the axial direction and holds the wire between the lid and the guide bridge;
the wiring through hole is located next to the circuit board in a circumferential direction when viewed in the axial direction; and
the guide bridge is bridged from an end on a radially inner side of the wiring through hole to an end on a radially outer side, inside the wiring through hole.

2. The motor according to claim 1, wherein the guide bridge includes at least one recessed groove that holds the wire, on a surface of one side in the axial direction.

3. The motor according to claim 2, wherein
the guide bridge includes a first recessed groove that holds a first wire having a first wire diameter, and a second recessed groove that holds a second wire having a second wire diameter smaller than the first wire diameter; and
a distance in the axial direction from a bottom surface of the first recessed groove to the lid is larger than a distance in the axial direction from a bottom surface of the second recessed groove to the lid.

4. The motor according to claim 2, wherein
the guide bridge includes a first recessed groove that holds a first wire having a first wire diameter, and a second groove that holds a second wire having a second wire diameter smaller than the first wire diameter; and
the first recessed groove is located at a radially inner side from the second recessed groove.

5. The motor according to claim 1, wherein
the lid includes a recess that is recessed toward one side in the axial direction or a lid through hole that penetrates the lid in the axial direction, in a region facing the guide bridge in the axial direction; and
an edge of the recess or the lid through hole presses the wire from one side in the axial direction.

6. The motor according to claim 5, further comprising a seal that closes the lid through hole.

7. The motor according to claim 1, wherein a connecting portion between the wire and the circuit board is a solder joint portion.

\* \* \* \* \*